(12) United States Patent
Sugihara et al.

(10) Patent No.: US 8,463,138 B2
(45) Date of Patent: Jun. 11, 2013

(54) MULTI-VALUE OPTICAL TRANSMITTER

(75) Inventors: Takashi Sugihara, Tokyo (JP); Soichiro Kametani, Tokyo (JP); Takashi Mizuochi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 331 days.

(21) Appl. No.: 12/826,129

(22) Filed: Jun. 29, 2010

(65) Prior Publication Data

US 2011/0013907 A1 Jan. 20, 2011

(30) Foreign Application Priority Data

Jul. 17, 2009 (JP) ................................ 2009-169110

(51) Int. Cl.
*H04B 10/04* (2006.01)
*H04B 10/12* (2006.01)

(52) U.S. Cl.
USPC ........... 398/197; 398/182; 398/183; 398/184; 398/185; 398/186; 398/187; 398/188; 398/190; 398/191; 398/192; 398/193; 398/194; 398/195; 398/196; 398/198; 398/199; 398/200; 398/201

(58) Field of Classification Search
None
See application file for complete search history.

(56) References Cited

U.S. PATENT DOCUMENTS

| | | | |
|---|---|---|---|
| 5,208,817 A | 5/1993 | Kao et al. | |
| 7,023,534 B2 | 4/2006 | Lee et al. | |
| 7,023,601 B2 | 4/2006 | McGhan et al. | |
| 7,034,977 B2 | 4/2006 | Harel et al. | |
| 7,046,414 B2 | 5/2006 | Ohhira | |
| 7,058,313 B2 | 6/2006 | Shimizu et al. | |
| 7,092,643 B2 | 8/2006 | Kajiya et al. | |
| 7,106,486 B1 | 9/2006 | Nahapetian et al. | |
| 7,266,306 B1 | 9/2007 | Harley et al. | |
| 7,546,041 B2 | 6/2009 | Griffin | |

(Continued)

FOREIGN PATENT DOCUMENTS

| | | |
|---|---|---|
| EP | 1 004 920 A2 | 5/2000 |
| EP | 1 004 920 A3 | 5/2000 |

(Continued)

OTHER PUBLICATIONS

U.S. Appl. No. 12/920,851, filed Sep. 3, 2010, Mizuochi, et al.

(Continued)

*Primary Examiner* — Kenneth N Vanderpuye
*Assistant Examiner* — Darren E Wolf
(74) *Attorney, Agent, or Firm* — Oblon, Spivak, McClelland, Maier & Neustadt, L.L.P.

(57) ABSTRACT

Provided is a multi-value optical transmitter in which a DC bias may be controlled to be stabilized so as to obtain stable optical transmission signal quality in multi-value modulation using a dual-electrode MZ modulator. The multi-value optical transmitter includes: D/A converters for performing D/A conversion on first and second modulation data which are set based on an input data series, so as to generate a first and a second multi-value signal, respectively; a dual-electrode MZ modulator including phase modulators for modulating light from a light source based on the first multi-value signal and the second multi-value signal, so as to combine optical signals from the phase modulators to output the optical multi-value signal; an optical output power monitor for detecting average power of the optical multi-value signal; and a DC bias control unit for controlling a DC bias for the dual-electrode MZ modulator, so as to maximize the average power.

4 Claims, 5 Drawing Sheets

U.S. PATENT DOCUMENTS

| | | | |
|---|---|---|---|
| 7,657,190 | B2 | 2/2010 | Akiyama |
| 2003/0175037 | A1* | 9/2003 | Kimmitt et al. .............. 398/198 |
| 2005/0105917 | A1 | 5/2005 | Narusawa et al. |
| 2005/0201669 | A1* | 9/2005 | Welch et al. .................. 385/14 |
| 2006/0127102 | A1* | 6/2006 | Roberts et al. ............... 398/182 |
| 2006/0245763 | A1 | 11/2006 | Ishida et al. |
| 2006/0263098 | A1 | 11/2006 | Akiyama et al. |
| 2007/0133918 | A1* | 6/2007 | Cho et al. ........................ 385/1 |
| 2007/0248362 | A1 | 10/2007 | Tanaka et al. |

FOREIGN PATENT DOCUMENTS

| | | |
|---|---|---|
| EP | 1 923 739 A1 | 5/2008 |
| JP | 3-75615 | 3/1991 |
| JP | 6-29603 | 2/1994 |
| JP | 2003-177361 | 6/2003 |
| JP | 2004-37647 | 2/2004 |
| JP | 2004-516743 | 6/2004 |
| JP | 2005-148329 | 6/2005 |
| JP | 2005-202400 | 7/2005 |
| JP | 2006-517686 | 7/2006 |
| JP | 2007-43638 | 2/2007 |
| JP | 2007-163941 | 6/2007 |
| JP | 2007-208472 | 8/2007 |
| JP | 2007-267001 | 10/2007 |
| JP | 2007-286551 | 11/2007 |

OTHER PUBLICATIONS

Keang-Po Ho, et al., "Generation of Arbitrary Quadrature Signals Using One Dual-Drive Modulator", Journal of Lightwave Technology, vol. 23, No. 2, Feb. 2005, pp. 764-770.

Takahide Sakamoto, et al., "50-Gb/s 16 QAM by a quad-parallel Mach-Zehnder modulator", ECOC2007, PD2.8, 2 pages.

David J. Krause, "Demonstration of 20-Gb/s DQPSK With a Single Dual-Drive Mach-Zehnder Modulator", IEEE Photonics Technology Letters, vol. 20, No. 16, Aug. 15, 2008, pp. 1363-1365.

D. McGhan, "Electronic Dispersion Compensation", OFC/NFOEC2006, OWK1, 15 pages.

U.S. Appl. No. 13/140,955, filed Jun. 20, 2011, Sugihara, et al.

Extended European Search Report dated Oct. 20, 2010 in corresponding European Application No. 10 00 6726.

U.S. Appl. No. 13/498,626, filed Mar. 28, 2012, Mizuochi, et al.

Office Action mailed Oct. 16, 2012, in Japanese Patent Application No. 2009-169110, filed Jul. 17, 2009 (with English-language Translation).

* cited by examiner

FIG.5B

MULTI-VALUE OPTICAL TRANSMITTER

BACKGROUND OF THE INVENTION

1. Field of the Invention

The present invention relates to a multi-value optical transmitter for converting an electrical signal into an optical signal and transmitting the optical signal.

2. Description of the Related Art

In order to realize a large capacity of a wavelength division multiplex (WDM) optical communication system, it is useful to increase a transmission rate per wavelength. When a symbol rate of symbols transmitted to an optical transmission line is increased without changing a modulation method, there is a problem in that wavelength dispersion tolerance of the optical transmission line reduces because an allowable residual dispersion amount is inversely proportional to the square of the symbol rate. It is necessary to execute electrical signal processing at high speed, and hence there is a problem in that the cost of an analog electrical part increases.

Therefore, in recent years, researches for improving signal multiplicity per symbol without increasing the symbol rate so as to realize the large capacity of the system have been actively conducted.

Known examples of a method of improving the signal multiplicity include multi-value modulation methods such as a quadrature phase shift keying (QPSK) method of assigning a binary value (multiplicity is two) to each symbol to increase a transmission capacity two times, a 16-quadrature amplitude modulation (16QAM) method of assigning a quaternary value (multiplicity is four) to each symbol to increase the transmission capacity four times, and a 16-amplitude phase shift keying (16APSK) method.

In general, when any of the multi-value modulation methods is executed, an I/Q modulator is used as an optical modulator. The I/Q modulator is an optical modulator capable of independently generating orthogonal optical electric field components (I channel and Q channel) and has a special structure in which Mach-Zehnder (MZ) modulators are connected in parallel.

For example, when the QPSK method is to be executed, a dual parallel MZ modulator (DPMZM) is used in which two MZ modulators are connected in parallel (see, for example, JP 2004-516743 A).

When the 16QAM method is executed, the DPMZM or a quad parallel MZ modulator (QPMZM) in which two DPMZMs are connected in parallel is used (see, for example, T. Sakamoto, et al., "50-Gb/s 16 QAM by a quad-parallel Mach-Zehnder modulator", ECOC2007, PD2.8, 2007).

Even when any of the DPMZM and the QPMZM as described above is used, the number of MZ modulators increases, and hence there is a problem that a manufacturing cost and the number of bias control points increase.

Therefore, it is expected to use a dual-electrode MZ modulator (dual drive MZM (DDMZM)) in which two phase modulators are connected in parallel, so as to realize the multi-value modulation (see, for example, K-P. Ho, et al., "Generation of Arbitrary Quadrature Signals Using One Dual-Drive Modulator", IEEE J. Lightwave Technol., Vol. 23, No. 2, February 2005, pp. 764-770, and D. J. Krause, et al., "Demonstration of 20-Gb/s DQPSK with a Single Dual-Drive Mach-Zehnder Modulator", IEEE Photon. Technol. Lett., Vol. 20, No. 16, Aug. 15, 2008, pp. 1363-1365).

The dual-electrode MZ modulator is an optical part widely applied as a push-pull optical modulator to a normal optical transmitter-receiver, and hence a reduction in cost may be realized. In addition, a light insertion loss may be reduced because of the structure in which light passes through the MZ modulator only once.

Figure 5A:
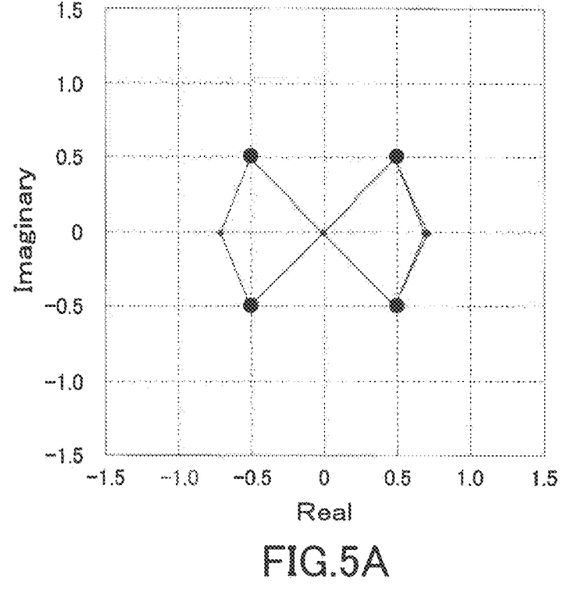
FIGS. 5A and 5B are explanatory diagrams illustrating signal point arrangements with respect to three-value driving and four-value driving in a case where QPSK is executed using a dual-electrode MZ modulator.
Figure 5B:
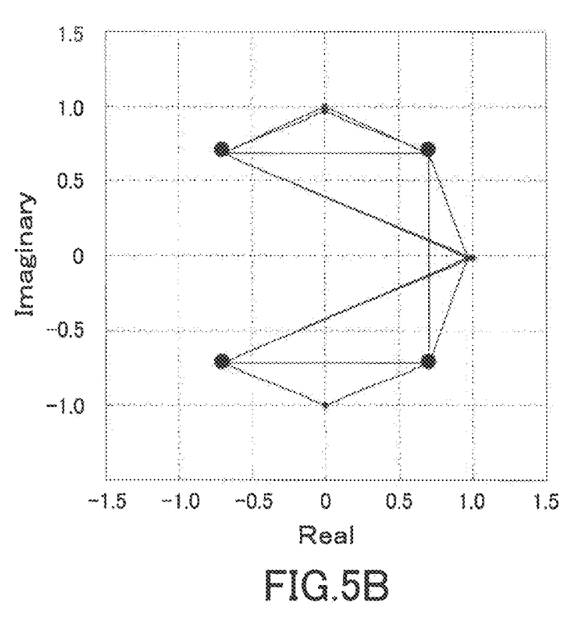

Next, a case where the QPSK is executed using the dual-electrode MZ modulator is considered with reference to FIGS. 5A and 5B. With respect to the QPSK using the dual-electrode MZ modulator, a method with a signal point configuration illustrated in FIG. 5A (three-value driving) has been demonstrated up to now (see, for example, D. J. Krause, et al., "Demonstration of 20-Gb/s DQPSK with a Single Dual-Drive Mach-Zehnder Modulator", IEEE Photon. Technol. Lett., Vol. 20, No. 16, Aug. 15, 2008, pp. 1363-1365).

FIG. 5A illustrates a locus of change of an optical electric field on a complex plane in a case where the dual-electrode MZ modulator is driven with double over sampling. In FIG. 5A, black circles correspond to QPSK signal points.

In order to take advantage of a low insertion loss which is a feature of the dual-electrode MZ modulator, modulator driving based on an four-value electrical signal, which is superior to the three-value driving, is used. When the four-value driving is performed, a loss in the dual-electrode MZ modulator is smaller than a loss in the case of the three-value driving by approximately 3 dB (see, for example, K-P. Ho, et al., "Generation of Arbitrary Quadrature Signals Using One Dual-Drive Modulator", IEEE J. Lightwave Technol., Vol. 23, No. 2, February 2005, pp. 764-770).

FIG. 5B illustrates a locus of change of an optical electric field on a complex plane in a case where the QPSK of the four-value driving is executed using the dual-electrode MZ modulator.

As in a case where normal on-off keying (OOK) transmission is executed, even when the multi-value modulation is executed using the dual-electrode MZ modulator as an optical modulator, in order to obtain stable optical transmission signal quality, it is essential to stabilize a direct current (DC) bias for determining an operating point of the dual-electrode MZ modulator.

However, the conventional technologies have the following problem.

As described above, when the dual-electrode MZ modulator is used as the optical modulator, it is essential to stabilize the DC bias for determining the operating point of the dual-electrode MZ modulator. However, up to now, there is a problem that DC bias stabilization control technologies for the QPSK of four or more values using the dual-electrode MZ modulator are not disclosed.

SUMMARY OF THE INVENTION

The present invention has been made to solve the problem as described above. An object of the present invention is to provide a multi-value optical transmitter in which a DC bias may be controlled to be stabilized to obtain stable optical transmission signal quality in a case where multi-value (particularly four or more values) modulation using a dual-electrode MZ modulator is executed.

According to the present invention, there is provided a multi-value optical transmitter for converting an input data series which is an input electrical signal into an optical multi-value signal and outputting the optical multi-value signal, including: a first D/A converter for performing D/A conversion on first modulation data set based on the input data series to generate a first multi-value signal; a second D/A converter for performing D/A conversion on second modulation data set based on the input data series to generate a second multi-value signal; a light source; a dual-electrode MZ modulator including: a first phase modulator for modulating light from the light source based on the first multi-value signal; and a second phase modulator for modulating the light from the light source based on the second multi-value signal, the dual-electrode MZ modulator outputting the optical multi-value signal by combining an optical signal from the first phase modulator and an optical signal from the second phase modulator; power monitor means for detecting average power of the optical multi-value signal; and DC bias control means for controlling a DC bias for the dual-electrode MZ modulator, so as to maximize the average power.

According to the multi-value optical transmitter of the present invention, the DC bias control means controls the DC bias for the dual-electrode MZ modulator to maximize the average power of the optical multi-value signal output from the dual-electrode MZ modulator.

Therefore, a deviation of the DC bias from an optimum value is compensated, and hence the DC bias may be stabilized.

Thus, when the DC bias is controlled to be stabilized in a case where multi-value modulation using the dual-electrode MZ modulator is executed, the multi-value optical transmitter in which the stable optical transmission signal quality may be obtained may be provided.

DETAILED DESCRIPTION OF THE PREFERRED EMBODIMENT

Hereinafter, a multi-value optical transmitter according to a preferred embodiment of the present invention is described with reference to the attached drawings. In the respective drawings, the same or corresponding components are expressed for description by the same reference symbols.

In the following embodiment, a case where QPSK of four-value driving is executed using a dual-electrode MZ modulator is described as an example.

Embodiment 1

Figure 1:
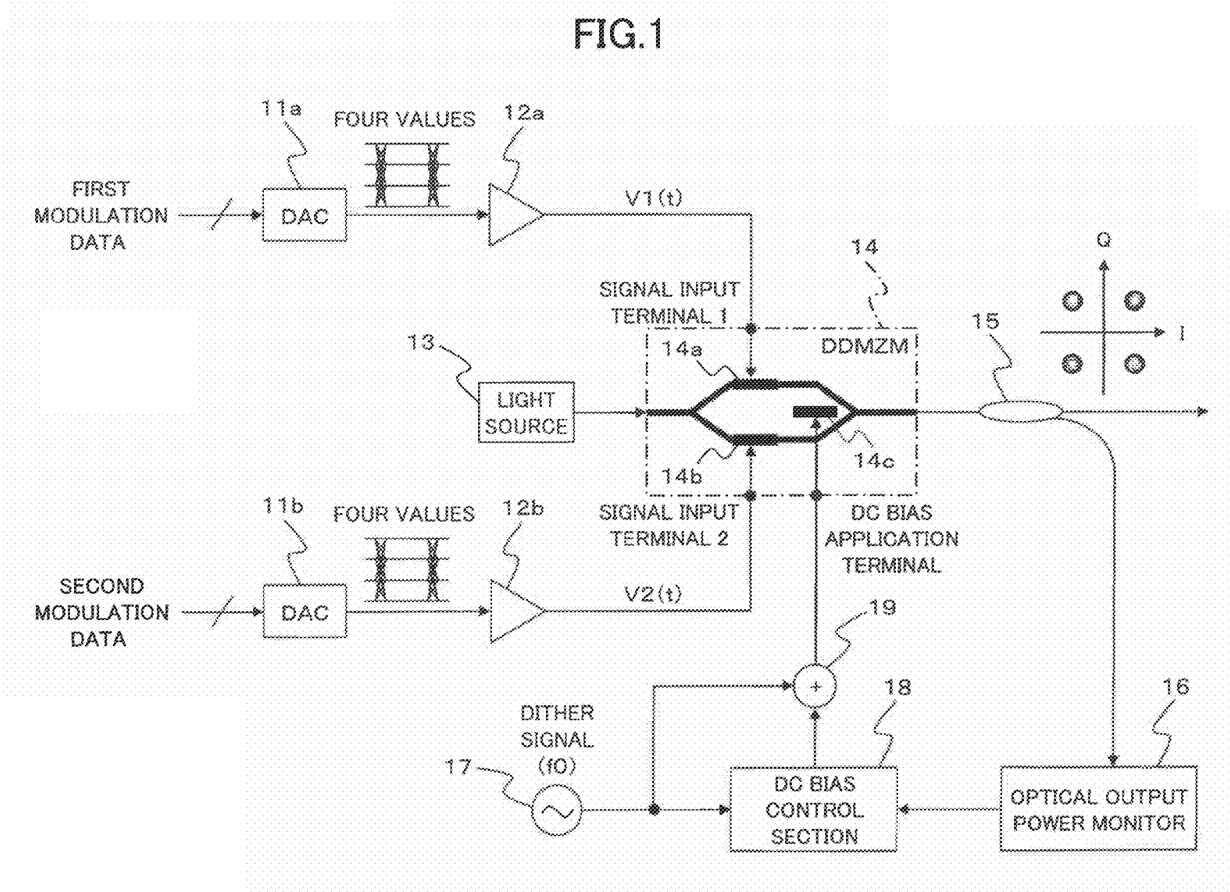
FIG. 1 is a block structural diagram illustrating a multi-value optical transmitter according to Embodiment 1 of the present invention.

FIG. 1 is a block structural diagram illustrating a multi-value optical transmitter according to Embodiment 1 of the present invention.

In FIG. 1, the multi-value optical transmitter includes two D/A converters (first and second D/A converters) 11a and 11b, two electrical amplifiers 12a and 12b, a light source 13, a dual-electrode MZ modulator (DDMZM) 14, an optical tap coupler 15, an optical output power monitor (power monitor means) 16, an oscillator 17, a DC bias control section 18, and an adder 19.

The dual-electrode MZ modulator 14 includes two phase modulators (first and second phase modulators) 14a and 14b and an electrode 14c for bias. A first signal input terminal, a second signal input terminal, and a DC bias application terminal are provided in the dual-electrode MZ modulator 14 and connected to the phase modulator 14a, the phase modulator 14b, and the electrode 14c, respectively. The oscillator 17, the DC bias control section 18, and the adder 19 serve as DC bias control means.

Hereinafter, the functions of the respective components of the multi-value optical transmitter are described.

First, an input data series input to the multi-value optical transmitter is developed in parallel and input to a look-up table (LUT) (not shown). Set values (first modulation data and second modulation data) for the digital/analog (D/A) converters 11a and 11b which correspond to the input data series developed in parallel are output from the LUT.

The D/A converters 11a and 11b D/A- convert the set values output from the LUT to generate a first multi-value signal and a second multi-value signal, respectively. The electrical amplifiers 12a and 12b amplify the first multi-value signal and the second multi-value signal from the D/A converters 11a and 11b to voltage amplitudes necessary for optical modulation to generate a first drive electrical signal $V1(t)$ and a second drive electrical signal $V2(t)$ and outputs the first drive electrical signal $V1(t)$ and the second drive electrical signal $V2(t)$ to the first signal input terminal and the second signal input terminal of the dual-electrode MZ modulator 14, respectively.

Each of the first multi-value signal and the second multi-value signal takes a four-value analog voltage. When the QPSK is executed, the D/A converters 11a and 11b are set to obtain, as the first and second drive electrical signals ($V1(t)$ and $V2(t)$), four sets of voltages ($3/4 \times V\pi$ and $-1/4 \times V\pi$), ($1/4 \times V\pi$ and $-3/4 \times V\pi$), ($5/4 \times V\pi$ and $1/4 \times V\pi$ ), and ($-1/4 \times V\pi$ and $-5/4 \times V\pi$). Therefore, a QPSK signal may be obtained as an output of the dual-electrode MZ modulator 14. Note that $V\pi$ indicates a half-wavelength voltage of the dual-electrode MZ modulator 14.

In the dual-electrode MZ modulator 14, the phase modulators 14a and 14b are driven based on the first drive electrical signal $V1(t)$ and the second drive electrical signal $V2(t)$ from the electrical amplifiers 12a and 12b to modulate continuous wave (CW) light from the light source 13, to thereby output a modulated optical signal. In this case, the D/A converters 11a and 11b are set so as to obtain the four sets of voltages described above, and hence an optical multi-value signal may be obtained as the modulated optical signal output from the dual-electrode MZ modulator 14.

An operating point of the dual-electrode MZ modulator 14 is determined based on a bias voltage applied to the electrode 14c according to a bias signal input to the DC bias application terminal. The bias signal input to the dual-electrode MZ modulator 14 is described in detail later.

The optical tap coupler 15 branches a part of the optical multi-value signal output from the dual-electrode MZ modulator 14 and outputs the branched part of the optical multi-value signal to the optical output power monitor 16.

The optical output power monitor 16 has a photoelectric conversion function including respective functions such as an optical power-current conversion using a photo detector (PD) and a current-voltage conversion using a trans-impedance amplifier (TIA), and an AC coupling function using a capacitor. The optical output power monitor 16 detects, as a monitor voltage, average power of an optical multi-value signal in a desired frequency band and outputs the average power as a monitor signal converted into a voltage signal .

The oscillator 17 outputs a low-speed dither signal having a frequency f0. The frequency f0 of the low-speed dither signal is set to a value sufficiently lower than a transmission symbol rate so as not to affect optical transmission signal quality.

The DC bias control section 18 receives the monitor signal from the optical output power monitor 16 and the low-speed dither signal from the oscillator 17. The DC bias control section 18 performs, for example, lock-in detection to detect an amplitude and phase (or sign) of a dither frequency (f0) component included in the monitor signal and executes feedback control to output a bias control signal.

The adder 19 superimposes the low-speed dither signal from the oscillator 17 on the bias control signal from the DC bias control section 18 to produce the bias signal. The bias signal produced in the adder 19 is input to the DC bias application terminal of the dual-electrode MZ modulator 14.

When a DC bias is controlled by the feedback control of the DC bias control section 18 to minimize the dither frequency component included in the monitor signal, a DC bias in the case where the QPSK of four-value driving (multi-value signal of four values) is executed using the dual-electrode MZ modulator 14 may be stabilized.

Hereinafter, a principle in which the DC bias may be stabilized by controlling the DC bias to minimize the dither frequency component included in the monitor signal is described with reference to FIGS. 2 and 3.

Figure 2:
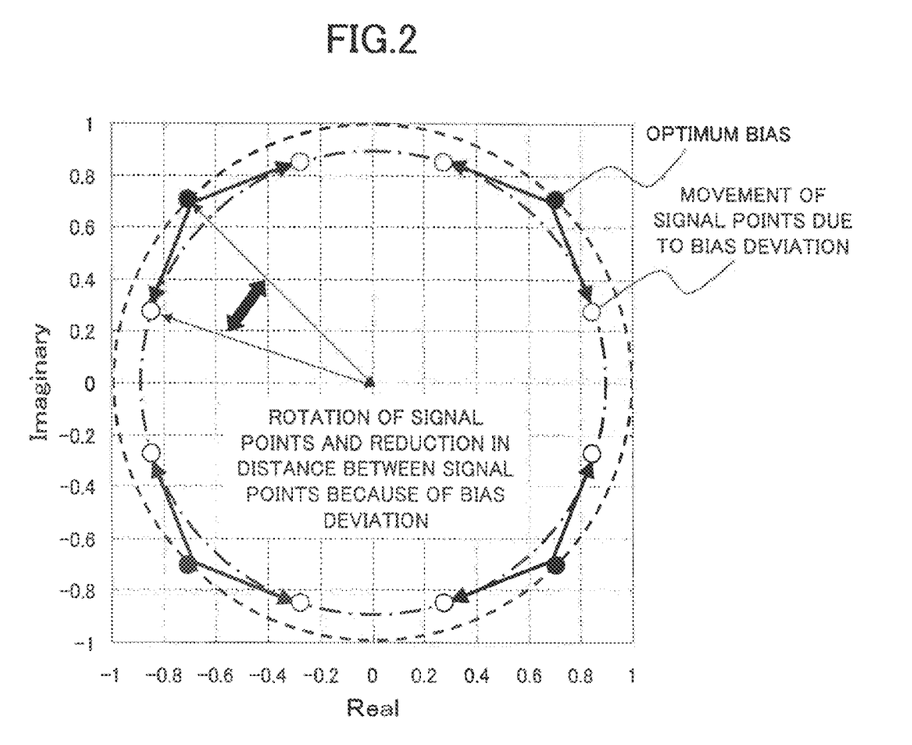
FIG. 2 is an explanatory diagram illustrating an operating principle of the multi-value optical transmitter according to Embodiment 1 of the present invention.

FIG. 2 is an explanatory diagram illustrating a change in signal point generated when the DC bias is deviated from an optimum value in the case where the QPSK of four-value driving is executed using the dual-electrode MZ modulator 14.

In FIG. 2, black circles indicate signal points in the case where the DC bias is the optimum value, and white circles indicate signal points in the case where the DC bias is deviated from the optimum value.

A diameter of a circle having a circumference on which the signal points are arranged in the case where the DC bias is deviated from the optimum value is smaller than a diameter of a circle having a circumference on which the signal points are arranged in the case where the DC bias is the optimum value. When the DC bias is deviated from the optimum value, the signal points rotate relative to the signal points in the case where the DC bias is the optimum value.

A shortening of distance between an original point and a signal point is equivalent to a reduction in average power of the optical multi-value signal. Therefore, when the average power of the optical multi-value signal from the dual-electrode MZ modulator 14 is detected, a deviation of the DC bias from the optimum value may be detected.

Figure 3:
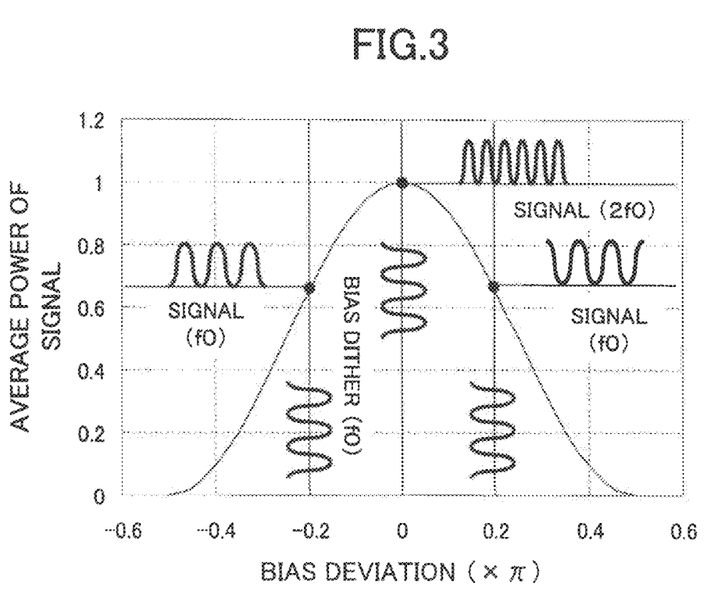
FIG. 3 is another explanatory diagram illustrating the operating principle of the multi-value optical transmitter according to Embodiment 1 of the present invention.

FIG. 3 is an explanatory diagram illustrating a change in average power of the optical multi-value signal due to the deviation of the DC bias from the optimum value.

In FIG. 3, a point at which the average power of the optical multi-value signal is maximum is matched to an optimum state of the DC bias.

A case where the low-speed dither signal (frequency f0) is applied to the DC bias is considered. In the optimum state of the DC bias, a component having a frequency two times the dither frequency (2×f0) is maximum and the dither frequency (f0) component is minimum. When the DC bias is deviated from the optimum value, it is apparent that the phase of the dither frequency component is inverted depending on the direction of deviation.

Therefore, when the amplitude and phase of the dither frequency component included in the monitor signal are detected by lock-in detection and the DC bias is feedback-controlled so as to minimize the amplitude and phase of the dither frequency component, the DC bias may be stabilized.

Subsequently, the processing of the DC bias control section 18 in the case where the amplitude and phase of the dither frequency component included in the monitor signal are detected by lock-in detection is described with reference to FIG. 4.

Figure 4:
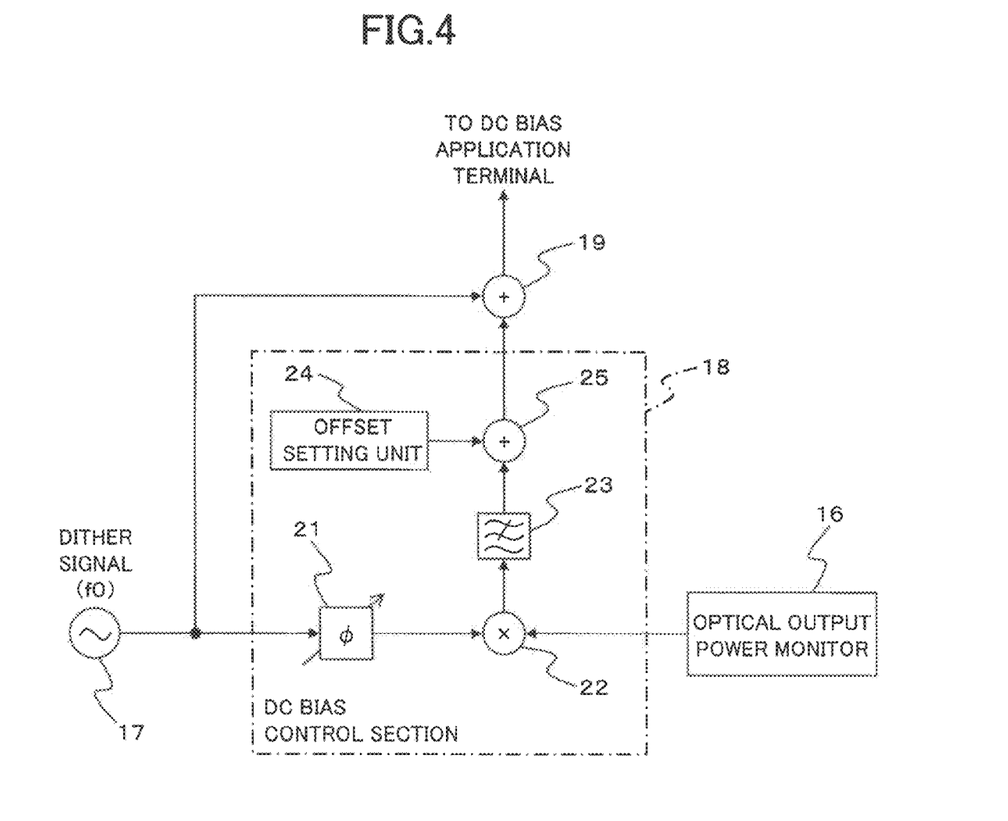
FIG. 4 is a block structural diagram illustrating DC bias control means of the multi-value optical transmitter according to Embodiment 1 of the present invention.

FIG. 4 is a block structural diagram illustrating the DC bias control section 18 illustrated in FIG. 1 together with the optical output power monitor 16, the oscillator 17, and the adder 19.

In FIG. 4, the DC bias control section 18 includes a phase shifter 21, a mixer 22, a low-pass filter (LPF) 23, an offset setting unit 24, and an adder 25.

Hereinafter, the functions of the respective sections of the DC bias control section 18 in a case where normal lock-in detection is executed are described.

The phase shifter 21 changes the phase of the low-speed dither signal from the oscillator 17 such that a relative phase with the signal of the dither frequency component included in the monitor signal is 0 degree (in phase) or 180 degrees (opposite phase). The phase shifter may have only a function for inverting the phase of the low-speed dither signal.

The mixer 22 multiplies the monitor signal from the optical output power monitor 16 and the phase-shifted low-speed dither signal from the phase shifter 21. The LPF 23 extracts, as an error signal, only a DC component from an output signal of the mixer 22.

When the dither frequency component is included in the monitor signal, the DC component corresponding to the amplitude of the dither frequency component is generated in the output signal of the mixer 22. Therefore, the amplitude of the dither frequency component may be detected based on a level of the DC component passing through the LPF 23. The phase of the dither frequency component included in the monitor signal may be determined based on a sign of the DC component passing through the LPF 23.

Thus, when the DC component passing through the LPF 23 is used as the error signal, the feedback control of the DC bias may be executed.

The offset setting unit 24 outputs an offset signal to be superimposed on the error signal from the LPF 23. The adder 25 superimposes the offset signal from the offset setting unit 24 on the error signal from the LPF 23 to produce the bias control signal.

For example, when a point at which the dither frequency component included in the monitor signal is zero is set as a control target, the control is executed such that the DC component passing through the LPF 23, which is the error signal, is zero. In this case, the point at which the error signal is zero is not normally matched to 0 V of the DC bias, and hence the offset signal from the offset setting unit 24 is superimposed on the error signal from the LPF 23. Therefore, even when the error signal is zero, a DC bias value necessary to maintain the control target may be set.

As described above, according to Embodiment 1, the DC bias control means controls the DC bias for the dual-electrode MZ modulator so as to maximize the average power of the optical multi-value signal output from the dual-electrode MZ modulator.

Therefore, the deviation of the DC bias from the optimum value is compensated, and hence the DC bias may be stabilized.

Thus, when the DC bias is controlled to be stabilized in the case where the multi-value modulation using the dual-electrode MZ modulator having a simple structure is executed, the multi-value optical transmitter in which the stable optical transmission signal quality may be obtained may be provided.

The oscillator outputs the dither signal which is superimposed on the DC bias and has the frequency sufficiently lower than the symbol rate for the first multi-value signal and the second multi-value signal. The DC bias control section controls the DC bias so as to minimize the dither frequency component included in the signal detected by the power monitor means.

Therefore, the DC bias may be controlled with a simple structure.

In Embodiment 1 described above, the case where the QPSK of four-value driving is executed using the dual-electrode MZ modulator is described as an example. However, the present invention is not limited to this case. In a case where multi-value modulation based on a first multi-value signal and a second multi-value signal each having voltage levels except for four values is executed using the dual-electrode MZ modulator, when the average power of the optical multi-value signal is maximum at the optimal value of the DC value, the multi-value optical transmitter in this application may be applied to any multi-value modulation.

Embodiment 1 described above describes that the DC bias control section 18 includes the phase shifter 21, the mixer 22, the LPF 23, the offset setting unit 24, and the adder 25, and executes the feedback control by analog processing to output the bias control signal. However, the present invention is not limited to this. The DC bias control section may execute the feedback control by digital processing using an A/D converter, a D/A converter, and a microprocessor, a field programmable gate array (FPGA), or a digital signal processor (DSP), to thereby output the bias control signal.

Even in this case, the same effect as in Embodiment 1 described above may be obtained.

Embodiment 1 described above describes that the DC bias is applied to the DC bias application terminal. However, the present invention is not limited to this. The DC bias may be applied to the first drive electrical signal V1(t) and the second drive electrical signal V2(t) by using a part such as a bias tee.

Even in this case, the same effect as in Embodiment 1 described above may be obtained.

Embodiment 1 described above describes that the optical tap coupler 15 and the optical output power monitor 16 are provided outside the dual-electrode MZ modulator 14. However, the present invention is not limited to this. The function of the optical tap coupler 15 and the function of the optical output power monitor 16 may be incorporated in the dual-electrode MZ modulator 14 to use the incorporated functions.

Even in this case, the same effect as in Embodiment 1 may be obtained.

What is claimed is:

1. A multi-value optical transmitter for converting an input data series which is an input electrical signal into an optical multi-value signal and outputting the optical multi-value signal, comprising:

a first D/A converter to perform D/A conversion on first modulation data set based on the input data series to generate a first multi-value signal;

a second D/A converter to perform D/A conversion on second modulation data set based on the input data series to generate a second multi-value signal;

a light source;

a dual-electrode MZ modulator comprising:
    a first phase modulator to modulate light from the light source based on the first multi-value signal, and
    a second phase modulator to modulate the light from the light source based on the second multi-value signal, the dual-electrode MZ modulator outputting the optical multi-value signal by combining an optical signal from the first phase modulator and an optical signal from the second phase modulator;

a power monitor to detect an average power of the optical multi-value signal; and a DC bias controller to control a DC bias for determining an operating point of the dual-electrode MZ modulator, to maximize the average power, the DC bias controller combining a signal detected by the power monitor with a phase-shifted dither signal, phase-shifted relative to a component of the signal detected by the power monitor, to generate the DC bias.

2. A multi-value optical transmitter according to claim 1, wherein each of the first multi-value signal and the second multi-value signal has voltage levels corresponding to at least four values.

3. A multi-value optical transmitter according to claim 1, wherein the DC bias controller comprises:

an oscillator to output a dither signal which is superimposed on the DC bias and has a frequency lower than a symbol rate for the first multi-value signal and the second multi-value signal, and the DC bias controller controls the DC bias to minimize a dither frequency component included in the signal detected by the power monitor.

4. The multi-value optical transmitter according to claim 3, wherein the DC bias controller further comprises:

a phase shifter to generate the phase-shifted dither signal by phase-shifting the dither signal to one of zero degrees and one hundred eighty degrees relative to the dither frequency component included in the signal detected by the power monitor, a mixer to multiply the phase-shifted dither signal with the signal detected by the power monitor, a low pass filter to filter an output of the mixer, an offset setting unit to output an offset signal to be superimposed on an output of the low pass filter, and an adder to superimpose the offset signal on an output of the low pass filter to produce a bias control signal.

* * * * *